United States Patent [19]

Burdges et al.

[11] 3,831,886
[45] Aug. 27, 1974

[54] AIRFOIL WITH EXTENDIBLE AND RETRACTABLE LEADING EDGE

[75] Inventors: Kenneth P. Burdges, Atlanta; Arthur J. Robertson, Sr., Marietta, both of Ga.

[73] Assignee: Lockheed Aircraft Corporation, Burbank, Calif.

[22] Filed: Jan. 26, 1973

[21] Appl. No.: 327,113

[52] U.S. Cl............................ 244/42 CC, 244/42 D
[51] Int. Cl. ...................... B64c 9/24, B64c 21/04
[58] Field of Search......... 244/42 C, 42 CA, 42 CC, 244/42 D, 40 R, 43, 130, 42 CB, 42 DA; 416/90 R, 90 A

[56] References Cited
UNITED STATES PATENTS

| 2,496,565 | 2/1950 | Stalker | 244/42 D |
| 2,774,555 | 12/1956 | Crawford et al. | 244/42 D |
| 2,886,264 | 5/1959 | Seager | 244/42 CC |
| 3,047,257 | 7/1962 | Chester | 244/42 DA |
| 3,093,350 | 6/1963 | Wilkins | 244/42 CC |
| 3,612,444 | 10/1971 | Girard | 244/42 CC |
| 3,743,220 | 7/1973 | Stinson | 244/42 CA |

Primary Examiner—Duane A. Reger
Assistant Examiner—Barry L. Kelmachter
Attorney, Agent, or Firm—Billy G. Corber; John J. Sullivan

[57] ABSTRACT

A leading edge device (referred to as a foreflap) is formed by passing a curved parting line through an airfoil in such a manner as to allow the front part of the airfoil to rotate about a pivot which is close to the wing external contour. When the foreflap is thus extended, the resulting airfoil contour has a large bulbous nose which is formed mainly by the parting line. The exact contour of the resulting nose may be shaped to optimum aerodynamic contour for high lift operation without adversely affecting high speed performance, since the parting surface is inside of the clean airfoil when the foreflap is retracted. The foreflap may be operated by any conventional means, e.g., a simple hinge located at the pivot outside of the airfoil contour.

7 Claims, 4 Drawing Figures

AIRFOIL WITH EXTENDIBLE AND RETRACTABLE LEADING EDGE

This invention relates generally to high lift devices as employed on aircraft and more particularly to high lift airfoils having an extendible and retractable leading edge whereby the overall profile of the airfoil is variable during movement through ambient air, to appreciably extend its range of speeds, angles of attack, and coefficients of lift.

High lift airfoils incorporate leading edges of two basic types. One of these displaces part of the external contour of the airfoil or wing and is capable of greatly increasing the camber of the wing near the leading edge as well as the length of the wing chord. The other extends or expands the entire wing nose forwardly and downwardly to a drooped position. While the latter (the so-called "droop nose wing") is not capable of the chord length increases to the extent of the former, it does not degrade the wing profile nor the structural integrity of the wing.

With the advent of advanced transonic airfoil sections a new problem was imposed on leading edge high lift devices. Transonic airfoils characteristically have a rapid transition from the leading edge radius to a relatively flat contour near the beginning of the chord length, i.e., within the first 10 percent of the chord length. This type of geometry is incompatible with the surface shape required for good conventional high-lift devices such as a slat, Krueger flap or the like. Thus, current practical configurations for leading edge high lift devices have restricted capability because of the geometric constraints imposed by use of the airfoil external contours near the leading edge.

The present invention, therefore, contemplates so configuring a freely extendible and retractable leading edge for a transonic airfoil that the constraints of the external airfoil contour are avoided. At the same time, the proposed configuration lends itself to a maximum increase of camber and chord length, as well as the accommodation of boundary layer control through air blowing, if desired, to further improve the aerodynamic performance of the airfoil when extended.

To the above ends, the leading edge section or nose of the airfoil is rotated about a fixed point relative to the remainder of the airfoil. When rotated to the extended position, this nose provides an external contour that has an aerodynamic pressure distribution that is smooth and especially shaped so as to delay leading edge stall. Lifting capability of the airfoil is thereby improved.

More specifically the airfoil nose is configured by striking an arc substantially tangent to the airfoil upper surfaces so that the arc intersects the airfoil lower surface at a predetermined point, i.e., a point located as a pre-selected percentage of the chord length. This predetermined point is established by and depends largely upon structural considerations. Generally speaking, it is located as far aft as possible and it usually is dictated by the location of internal spanwise structure of the airfoil.

With the above and other objects in view as will be apparent, this invention consists in the construction, combination and arrangement of parts all as more fully described, claimed and illustrated in the accompanying drawings wherein:

Referring more particularly to the drawings, 10 designates a portion of the fuselage of an aircraft adjacent a fixed wing 11 constituting substantially one symmetrical half of a typical aircraft. Medially of its length, i.e., its span, the wing 11 includes a pylon 12 mounting a jet engine 13 which in conjunction with the other engine or engines (not shown) provides the power for propulsion of the aircraft as well as high pressure air for the boundary layer air control system. when employed.

Figure 3:
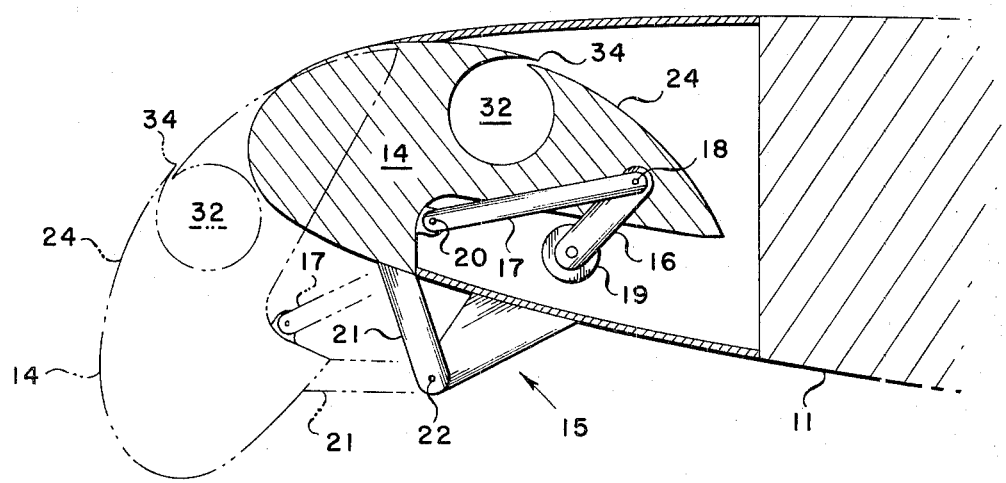
FIG. 3 is a transverse section taken along line 3—3 of FIG. 1 primarily to show schematically the actuating mechanism and linkage by which the foreflap is moved to and from its extreme positions of extension and retraction.
Figure 4:
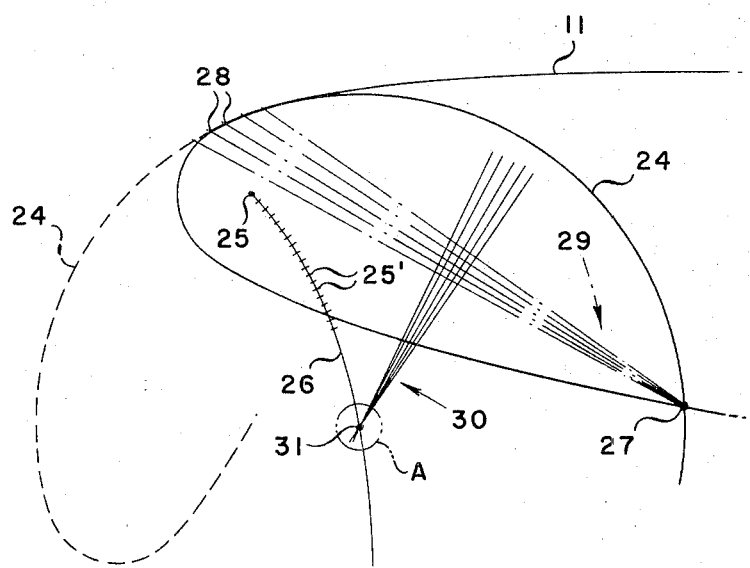
FIG. 4 is a section similar to FIG. 3 to show the method employed to develop and construct the foreflap configuration.

At and along its leading edge the wing 11 terminates in a movable foreflap 14, which may be comprised of end to end interconnected segments to facilitate the fabrication and installation thereof. The foreflap 14 is pivotally connected to the main wing body through hinge fittings and drive linkage generally indicated at 15. As best shown in FIG. 3 each drive linkage comprises a pair of links 16 and 17 pivotally interconnected as at 18 at adjacent ends, one connected at its opposite end to a gear box 19 mounted within the wing 11 and the other pivotally connected as at 20 at its opposite end of the foreflap 14. Each hinge fitting is effected by means of and through a rigid link 21 fixedly attached at one of its ends to the foreflap 14 and pivotally connected at its other end to a hinge point 22 secured in appropriate manner to the wing 11.

Figure 1:
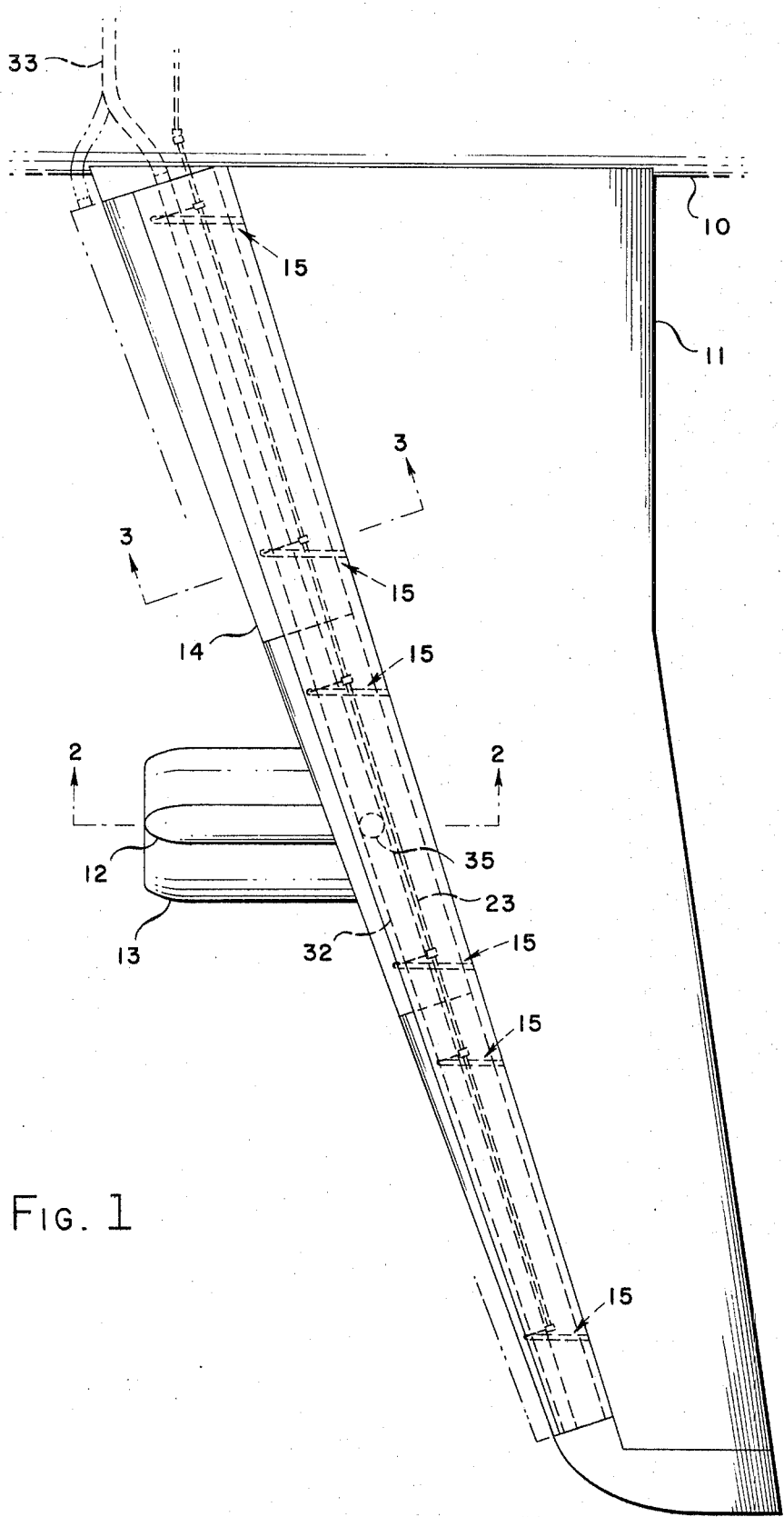
FIG. 1 is a plan view of a portion of an aircraft fuselage and one wing extending therefrom to show an application of the present invention whereby each wing of a typical aircraft is modified to incorporate a leading edge or foreflap designed and constructed according to the teachings hereof, the fully extended position of the foreflap and associated parts being illustrated in phantom lines.
Figure 2:
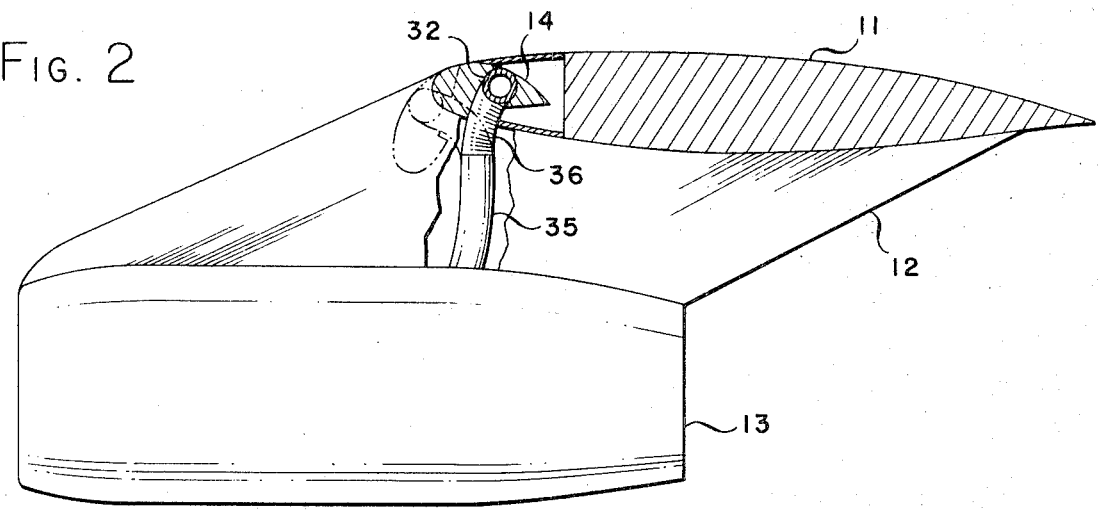
FIG. 2 is a transverse section taken along line 2—2 of FIG. 1 to show primarily the ducting by which air from the engine is conveyed to the foreflap for spanwise movement and ejection to effect boundary layer control of the airflow passing over each wing.

Several such hinge fittings and drive linkages 15 (FIG. 1) are thus provided at pre-selected, spanwise intervals along the length of the wing 11 being interconnected one to the next by means of and through a torque tube 23. All of the linkages 15 are thereby actuated in unison by suitable power means connected to the torque tube 23 in conventional manner to extend and retract the foreflap 14 on each wing 11.

The foreflap 14 is configured so as to form an aerodynamically clean and uninterrupted continuation of the wing profile at all times. To this end, the upper surface of the foreflap 14 is defined by an arc 24 substantially tangent to the upper surface of the wing 11 and intersecting the lower surface of the wing 11 at a point a predetermined percentage of the chord length. Generally speaking, this is accomplished by locating the center of the arc 24 in the area of the point where a line connecting the centers of curvature for selected points on the upper wing surface intersects the perpendicular bisector of a line between one of these selected points and the lower wing surface at the predetermined percent of the chord length.

More specifically starting with the locus 25 of the center of curvature of the wing nose a series of successive loci 25' for these centers of curvature of the upper wing surface are marked, establishing in effect a line 26. A point 27 is selected on the lower wing surface as far aft as internal spanwise structure of the wing 11 will permit. It has been found that something on the order of 15 percent of the chord length is a good location for the point 27. However, for all practical purposes it is contemplated that the location of point 27 may be as far aft at 20 percent of the wing chord length.

A series of points 28 is then selected on the upper wing surface approximately where the arc described by a circle about locus 25 merges, i.e., is tangential with the upper wing surface. A number of straight lines 29 is drawn between points 27 and 28 and a perpendicular bisector 30 of each of these lines 29 is drawn. The several bisectors 30 tend to converge as they intersect the line 26. Intersection 31 is thus selected within the area of convergence (indicated generally at A) as the center of rotation of the foreflap 24 and the pivots 18, 20, and 22 of the linkages 15 are located accordingly. Selection of the point 31 within the area A takes into consideration a clean parting line of the foreflap surface and adjacent wing surface as well as a structurally rigid wing edge.

In view of the foregoing construction and arrangement, the lift characteristics of an aircraft may be substantially increased by rotation of the torque tube 23 to concurrently deploy or extend the foreflaps 14 on each wing leading edge. In the extended position both the camber and chord of the wings 11 are increased with a corresponding change of the leading edge profiles without adversely affecting the aerodynamic pressure distribution on the wings 11. This results in delaying leading edge stall and, therefore, improved lifting capability of the wings 11.

By rotation of the torque tube 23 in the reverse direction the foreflaps 14 on each wing leading edge are concurrently retracted. In the fully retracted position the camber of the wings 11 is reduced to a minimum creating a high speed wing profile.

In order to augment the lifting capability of the wings 11 as previously described, boundary layer air control may also be employed. To this end a duct 32 is mounted internally of each foreflap 14 so as to run substantially the full length thereof. A connecting duct 33 with flexible duct ends extends across the fuselage 10 between the adjacent ends of these ducts 32. At discrete intervals in the length of each duct 32 is a nozzle 34 for ejection of the air therein outwardly over the foreflap 14. Each such nozzle 34 is so located and disposed that in the extended position of the foreflap 14 a continuous sheet of air is ejected over the wing 11 in an aftwardly direction, i.e., downstream.

The source of air passing through ducts 32 and 33 and ejected from nozzles 34 as above described is preferably the engine/engines 13. Thus, high pressure air is extracted from one or more engines 13 through a duct 35 with a flexible end 36 appropriately connected between the interior of the engine housing and the adjacent duct 32. The manner of such connections as well as the housing as required is well within the state of the art and per se forms no part of the present invention. Also, the flexible ducts 32, 33, and 35 together with their respective mountings constitute known prior art.

What is claimed is:

1. An airfoil comprising an extendible and retractable leading edge flap defined by a surface configured by an arc substantially tangent to the adjacent airfoil upper surface at each position throughout movement of said flap during its extension and retraction, said arc intersecting the adjacent airfoil lower surface at a point located a predetermined percentage of the airfoil chord length, whereby said leading edge flap provides an external upper contour which forms an unbroken continuation on the adjacent airfoil surface with a smooth aerodynamic pressure distribution at all times during its extension and retraction, and a hinge fitting formed by a rigid link fixedly attached at one of its ends to said flap to extend therefrom and pivotally connected at its other end to a hinge point secured to and projecting from said airfoil lower surface establishing a pivot for said flap at substantially the point where a line connecting the centers of curvature for successive points on said airfoil upper surface intersects the perpendicular bisector of a line between one of said points proximate the tangency point of said arc with said airfoil upper surface when said flap is fully retracted and the predetermined point on the airfoil lower surface aforesaid.

2. The airfoil of claim 1 wherein the intersection of the arc with the lower surface as aforesaid is located at a point on the order of 15 percent of the airfoil chord length.

3. The airfoil of claim 1 including a spanwise duct within said leading edge flap, nozzles at discrete intervals in the length of said duct opening outwardly of said arc in an aftward direction and so located as to be disposed upstream of said adjacent airfoil upper surface when said leading edge is in the extended position, and a source of air under pressure communicating with the interior of said duct.

4. The airfoil of claim 3 wherein said spanwise duct includes a flexible duct between it and said source of air under pressure.

5. The airfoil of claim 3 in combination with an aircraft powered by at least one engine and further including a duct operatively connected between the interior of each said engine and said spanwise duct constituting the source of air aforesaid.

6. The airfoil of claim 5 wherein the aforesaid duct between said engine and said spanwise duct is flexible adjacent one end.

7. The airfoil of claim 1 wherein said leading edge flap is formed by multiple interconnected segments disposed end to end and at least one hinge fitting is connected as aforesaid to each segment, and including a drive linkage pivotally connected at opposite ends to said airfoil and to said flap and a torque tube common to all of said drive linkages for the actuation thereof in unison.

* * * * *